US011400639B2

(12) United States Patent
Bastiaansen et al.

(10) Patent No.: US 11,400,639 B2
(45) Date of Patent: Aug. 2, 2022

(54) TRANSPARENT DRAWN ARTICLE

(71) Applicant: DSM IP ASSETS B.V., Heerlen (NL)

(72) Inventors: Cornelis Wilhelmus Maria Bastiaansen, Echt (NL); John Richard Severn, Echt (NL); Lihua Shen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 475 days.

(21) Appl. No.: 16/336,221

(22) PCT Filed: Sep. 27, 2017

(86) PCT No.: PCT/EP2017/074452
§ 371 (c)(1),
(2) Date: Mar. 25, 2019

(87) PCT Pub. No.: WO2018/060224
PCT Pub. Date: Apr. 5, 2018

(65) Prior Publication Data
US 2020/0023567 A1 Jan. 23, 2020

(30) Foreign Application Priority Data
Sep. 27, 2016 (EP) .................................... 16190850

(51) Int. Cl.
| | | |
|---|---|---|
| B29D 7/01 | (2006.01) | |
| B29C 55/00 | (2006.01) | |
| C08F 110/02 | (2006.01) | |
| C08F 10/02 | (2006.01) | |
| B29C 55/06 | (2006.01) | |
| B29K 23/00 | (2006.01) | |
| B29L 31/30 | (2006.01) | |
| B29L 31/34 | (2006.01) | |
| B29L 31/00 | (2006.01) | |

(52) U.S. Cl.
CPC .......... *B29C 55/005* (2013.01); *B29C 55/065* (2013.01); *C08F 10/02* (2013.01); *B29K 2023/065* (2013.01); *B29K 2995/0026* (2013.01); *B29K 2995/0045* (2013.01); *B29K 2995/0063* (2013.01); *B29K 2995/0077* (2013.01); *B29K 2995/0088* (2013.01); *B29L 2031/3052* (2013.01); *B29L 2031/3456* (2013.01); *B29L 2031/768* (2013.01); *C08F 110/02* (2013.01)

(58) Field of Classification Search
CPC ..... B29C 55/065; B29C 55/005; B32B 27/08; B29K 2995/0063; B29K 2995/0026; B29K 2995/0045; B29K 2995/0077; B29K 2995/0088; B29K 2023/065; B29L 2031/3456; B29L 2031/3052; B29L 2031/768; C08F 10/02; C08F 2500/07; C08F 2500/12; C08F 110/02

USPC ........................................................ 526/352
See application file for complete search history.

(56) References Cited

U.S. PATENT DOCUMENTS

| | | | |
|---|---|---|---|
| 4,348,350 A | | 9/1982 | Meier et al. |
| 4,655,769 A | * | 4/1987 | Zachariades ............ A61L 27/16 138/103 |
| 5,091,133 A | | 2/1992 | Kobayashi et al. |
| 5,547,722 A | * | 8/1996 | Uehara ................... B32B 27/34 428/35.7 |
| 5,554,755 A | * | 9/1996 | Godfrey .................... A61P 3/04 546/202 |
| 6,545,105 B1 | * | 4/2003 | Follestad ................ C08F 10/00 526/65 |
| 6,953,831 B2 | * | 10/2005 | Ishihama ................ C08F 10/02 526/352 |
| 8,173,569 B2 | * | 5/2012 | Jorgensen ............... C08F 10/02 502/109 |

(Continued)

FOREIGN PATENT DOCUMENTS

| | | | |
|---|---|---|---|
| EP | 1 469 104 | 10/2004 | |
| EP | 3 109 276 A1 * | 12/2016 | .............. C08L 23/06 |
| WO | 2007/122010 | 11/2007 | |
| WO | WO 2010/063444 A1 * | 6/2010 | .............. C08F 10/02 |
| WO | 2013/087827 | 6/2013 | |
| WO | 2017/103055 | 6/2017 | |

OTHER PUBLICATIONS

Leszek Jarecki, et al., "Ultra-high modulus polyethylene. 1 Effect of drawing temperature.", Polymer, ElSevier Science Publishers B.V., GB, Sep. 1, 1979, vol. 20, No. 9, 5 pages.

(Continued)

*Primary Examiner* — Rip A Lee
(74) *Attorney, Agent, or Firm* — Nixon & Vanderhye P.C.

(57) ABSTRACT

The invention relates to a process for the production of a high strength transparent high density polyethylene article comprising the steps of (i) heating a high density polyethylene (HDPE) to a temperature above the melting temperature ($T_m$) of the HDPE; (ii) molding the heated HDPE obtained in step (i) to form a hot molded HDPE article; (iii) cooling the hot molded HDPE article to a temperature below $T_m$ to form a melt-crystallized HDPE article; (iv) stretching the melt-crystallized HDPE article to a total draw ratio of at least 5 comprising at least one stretching step of the article at a temperature $T_1$ below the melting temperature $T_m$ to a draw ratio ($DR_1$) of at least 2 to form an oriented HDPE article, wherein the HDPE has a melt flow index (MFI) measured at 21.6 kg and 190° C. according to ASTM D1238 of at most 1.5 g/l Omin, an isotropic density measured according to ISO 1 183-1 A of at most 0.955 g/cm3 and a $T_m$ measured according to ISO 1 1357-3 of greater than 130° C. The invention also relates to high strength transparent HDPE articles and products comprising the high strength transparent HDPE article such as ballistic resistant articles, visors, car parts, train parts, plane parts, windshields, windows and radomes.

19 Claims, No Drawings

(56) References Cited

U.S. PATENT DOCUMENTS

| | | | | |
|---|---|---|---|---|
| 8,796,409 B2* | 8/2014 | Zhao | ............... | C08F 10/02 |
| | | | | 526/352 |
| 9,029,486 B2* | 5/2015 | Kwon | ............... | C08F 10/00 |
| | | | | 526/131 |
| 2005/0287359 A1 | 12/2005 | Breese | | |
| 2009/0035546 A1 | 2/2009 | McLeod | | |
| 2009/0324918 A1 | 12/2009 | Kretzschmar et al. | | |
| 2012/0289667 A1* | 11/2012 | Lukesova | ............... | C08F 10/00 |
| | | | | 526/113 |
| 2017/0137977 A1* | 5/2017 | Lehmann | ............ | B29C 48/9135 |
| 2019/0161602 A1* | 5/2019 | Chang | ............... | C08L 23/06 |

OTHER PUBLICATIONS

International Search Report for PCT/EP2017/074452 dated Dec. 8, 2017, 6 pages.

* cited by examiner

TRANSPARENT DRAWN ARTICLE

This application is the U.S. national phase of International Application No. PCT/EP2017/074452 filed Sep. 27, 2017 which designated the U.S. and claims priority to EP 16190850.4 filed Sep. 27, 2016, the entire contents of each of which are hereby incorporated by reference.

The invention relates to transparent stretched molded articles comprising at least partially oriented high density polyethylene (HDPE) and to a method to produce such transparent molded articles.

Stretched molded articles comprising at least partially oriented high density polyethylene are well known products in the industry, very often they come in the form of fibres, tapes or films. Typically such products can be obtained by drawing in the solid state of both melt- or solution-crystallized polyethylene, resulting in a high degree of molecular orientation and chain-extension. Often the oriented high density polyethylene articles exhibit a high modulus and high strength, especially when measured in the direction of polyethylene orientation such as for example presented in WO2007/122010 and WO2013/087827. It was observed by the inventors that the optical transmittance, often also referred to as transparency, in the wavelength range between 400 and 700 nm of at least partially oriented polyethylene articles is usually rather low, both before and/or after a solid state drawing, which limits their usefulness in certain applications.

According to the inventors knowledge, only a few studies describe the preparation of solid state drawn polyethylene aiming to improve optically transmittance. In Jarecki et al, *Polymer (Guildf)*. 1979, 20, 1078, transparent ultra-drawn HDPE samples could be obtained by processing a low molecular weight polymer with a broad molecular weight distribution at high temperatures. Such method cannot be applied broadly to other polymers and manufacturing processes and hence transparent oriented polymer articles, especially transparent throughout the whole visible spectrum, are not readily available. Furthermore the low molecular weight and broad distribution will negatively affect attainable mechanical properties like the tensile strength of the transparent ultra-drawn tapes.

More recently the inventors reported in Appl. Mater. Interfaces, 2016, 8, 17549 an improved transparency of ultra-drawn melt-crystallized polyethylene by the presence of high refractive index additives. It was shown that these additives were effective with high density polyethylenes with a weight average molecular weight of ~100 kg/mol and that drawn transparent films with a maximum tensile strength of ~0.6 GPa could be produced.

It is hence the objective of the present invention to provide articles comprising at least partially oriented polyethylene with improved visible light transmittance that are not bound to the above described limitations of processing and performance, by for example presence of additives and low tensile strength.

This objective is achieved by performing the solid state drawing process on a melt-crystallized HDPE article wherein the HDPE has a melt flow index (MFI) measured at 21.6 kg and 190° C. according to ASTM D1238 of at most 1.5 dg/min, an isotropic density measured according to ISO 1183-1A of at most 0.955 g/cm³ and a $T_m$ measured according to ISO 11357-3 of greater than 130° C.

A stretched molded HDPE article made according to the above process provides an improved transmittance as compared to a molded article made from melt-crystallized HDPE article not having the mentioned properties.

In particular the process for preparation of the high strength transparent HDPE article comprises the steps of (i) heating a high density polyethylene (HDPE) to a temperature above the melting temperature ($T_m$) of the HDPE;
(ii) molding the heated HDPE obtained in step (i) to form a hot molded HDPE article;
(iii) cooling the hot molded HDPE article to a temperature below $T_m$ to form a melt-crystallized HDPE article;
(iv) stretching the melt-crystallized HDPE article to a total draw ratio of at least 5 comprising at least one stretching step of the article at a temperature $T_1$ below the melting temperature $T_m$ to a draw ratio ($DR_1$) of at least 2 to form an oriented HDPE article,
characterized in that the HDPE has a melt flow index (MFI) measured at 21.6 kg and 190° C. according to ASTM D1238 of at most 1.5 g/10min, an isotropic density measured according to ISO 1183-1A of at most 0.955 g/cm³ and a $T_m$ measured according to ISO 11357-3 of greater than 130° C.

In the context of the present invention stretched molded articles may have different shapes in particular stretched molded articles may be monofilaments, multifilament yarns, tapes, strips and films. The stretched molded article is preferably a monofilament, a tape or a film. In case the stretched molded article is a tape or a film, the melt-crystallized article is a melt-crystallized sheet. The invention further relates to articles obtained by dividing the stretched molded article into smaller articles by slitting, twisting, cutting or stretch breaking the article. Such further divided articles may hence be slit tapes, fibers, filaments, staple fibers or fibrillated tapes.

High density polyethylene (HDPE) in the context of the present application is a class of ethylene-based polymers having a density greater than 0.92 g/cm³ and a substantially linear molecular chain structure with less than 1 long chain branch per 1000 carbon and less than 1 short chain branch per 1000 carbon. By long chain branches is herein understood hydrocarbyl side chains with more than 20 carbon atoms such as oligo- or poly-ethylene branches attached to the polyethylene backbone, whereas short chain branches are understood to be hydrocarbyl side chains with at most 20 carbon atoms, such as methyl, ethyl or butyl side chains introduced by copolymerization. As used herein HDPE includes the variations of high molecular weight polyethylene (HMWPE) and ultra-high molecular weight polyethylene (UHMWPE) or mixtures thereof. The inventors observed that for HMWPE and UHMWPE transparent articles with improved mechanical properties could be obtained while transparency could be substantially maintained.

By molding in the context of the present invention is understood that the molten HDPE is brought into a shape via a molding step. The molding step is carried out above the melting temperature of the HDPE and in the absence of any substantial amounts of solvents or processing aids. Preferably the molding step is a low shear rate molding step, in other words the molding is performed under application of low shear rate conditions, whereby low shear refers to shear rates of less than 10 s⁻¹, preferably less than 5 s⁻¹, more preferably less than 1 s⁻¹ and most preferably less than 0.5 s⁻¹. Preferred low shear rate molding steps comprise but are not limited to calandering, compaction molding or continuous belt pressing of the HDPE above $T_m$. Said low shear molding step of the HDPE above $T_m$ stands in contrast to molding steps typically employed in the field of high strength drawn polyethylene articles where molding is performed in solution known as gel-spinning such as described in EP 0205960 or where molding is performed by compacting the polyethylene below its melting point, also known as solid state compression molding, such as described in U.S. Pat. No. 5,091,133.

Cooling of the hot molded article can be performed by any means known to the skilled person. For example by cooling the molding equipment in a semi- or dis-continuous process or by providing the hot molded article to a cooling medium in the form of a solid surface or a fluid, preferably a liquid at a temperature below the melting temperature of the HDPE. The cooling of the hot HDPE may occur simultaneous to the molding step by for example providing the molten HDPE to a molding equipment at or below the melting temperature of the HDPE whereby upon molding the HDPE will cool down and reach temperatures below its melting point soon after the molding started.

By melt-crystallized polyethylene is understood in the context of the present invention that the polyethylene has been maintained at a temperature above its melting temperature for a time sufficient to substantially remove the crystallinity and constrain of the polyethylene chains. Such removal of crystallinity and relaxation of the chains may be enhanced by the use of liquid additives, like a solvent, which will be removed before the molding step. The inventors identified that the optimal removal of crystallinity is obtained when before or during molding the HDPE is heated to a temperature at least 10° C. above the $T_m$ of the HDPE, preferably at least 15 and most preferably at least 20° C. above the $T_m$. In a yet preferred embodiment the melt crystallized HDPE article and/or the oriented HDPE article made during the process of the invention comprises at least 80 wt %, preferably at least 90 wt %, more preferably at least 95 wt % HDPE, whereby weight percentages are expressed as weight HDPE to the weight of the melt-crystallized HDPE article. Most preferably the melt crystallized HDPE article and/or the oriented HDPE article substantially consists of HDPE. In the context of the present invention substantially consisting of means that less than 2 wt %, preferably less than 1 wt % and most preferably less than 0.5 wt % of other components are present in the melt-crystallized HDPE article. Other components that may be present in the article may be typical additives such as stabilizers, coloring agents or coatings as well as residual portions of solvents.

By the herein described melting and compaction molding process a melt crystallized polyethylene article with substantially isotropic properties is obtained, wherein substantially isotropic means that the HDPE article has no preferred orientation of the polyethylene chains or crystals as could for example be observed by light scattering or crystallographic methods.

The melt-crystallized HDPE article is drawn or stretched in one or more steps to a total draw ratio of at least 5, whereby at least one stretching step is performed at a temperature $T_1$ of the HDPE below $T_m$ to a draw ratio ($DR_1$) of at least 2, preferably of at least 4, more preferably of at least 6 and most preferably of at least 8.

In a further preferred embodiment $T_1$ and $DR_1$ are the conditions of the first stretching step applied to the melt-crystallized HDPE article.

In a preferred embodiment the temperature $T_1$ is between 100 and 130° C., preferably between 110° C. and 128° C. and most preferably between 115° C. and 125° C. The inventors identified that especially for a first stretching step of the melt-crystallized HDPE article such temperatures provide an optimum balance of attainable draw rate and tensile strength of the stretched molded article.

Stretching is also often referred to as solid state stretching because it is performed at a temperature below the melting point and consists of an elongation of the molded article, resulting in an elongational deformation and an increase of orientation of the polyethylene chains while the molded article is kept at a temperature below the melting temperature of the polyethylene under the stretching conditions. Considering the herein provided preferences, the skilled person will be able to optimize the production process to provide stretch molded articles with transmittance and other physical properties that meet the requirements of the field in which the stretch molded article is intended to be applied.

The solid state stretching can also be performed by a constrained uniaxial drawing and/or drawing where the width of the article, e.g. tape, is largely preserved, such processes being known to the skilled person under the terminology as "kurz-spalt drawing".

By draw ratio in the context of the present invention is understood the ratio between the cross-sectional area of the stretched molded article before drawing to the cross-sectional area of the article after drawing, wherein cross-sectional areas are the surface of respective cross sections of the drawn article perpendicular to at least one drawing direction of the drawn article. Accordingly a draw ratio of 1 representative for a process without an actual reduction of the cross-sectional area of the article, while a draw ratio of 2 expresses a halving of the cross-sectional area of the article. The process might comprise more than one drawing or stretching step, each with its own draw ratio $DR_n$ and drawing temperature $T_n$. The total draw ratio $DR_{total}$ is the cumulative product of each individual draw ratio and can be calculated by multiplying the individual draw ratios. Alternatively the total draw ratio may be measured by comparing the original and final cross-section of the article.

In a preferred embodiment the inventive process comprises at least one further stretching step performed at a HDPE temperature of at least $T_2$ and a draw rate $DR_2$, whereby the further stretching is performed after the stretching at temperature $T_1$ and draw rate $DR_1$ and wherein the temperature $T_2$ is greater than $T_1$ ($T_2>T_1$), preferably at a temperature $T_2$ greater than $T_m$ ($T_2>T_m$), but preferably below the melting temperature of the already partially drawn article. The inventors observed that the drawing of the inventive stretched molded article in multiple drawing steps provided articles with further improved mechanical properties. Whereas the temperature of the HDPE during the at least one further drawing step might exceed the original melting temperature $T_m$ of the non-oriented HDPE, it should be noted that such will not lead to a melting of the article being processed since the melting temperature of the HDPE substantially increases with increasing molecular orientation of the polyethylene chains.

The HDPE present in the melt-crystallized article as well as the HDPE present in the stretch molded article has a melt flow index (MFI) measured at 21.6 kg and 190° C. according to ASTM D1238 of at most 1.5 g/10 min, an isotropic density measured according to ISO 1183-1A of at most 0.955 g/cm³ and a $T_m$ measured according to ISO 11357-3 of greater than 130° C.

Furthermore the HDPE of the melt-crystallized HDPE article as well as the HDPE present in the oriented HDPE article has a weight average molecular weight (Mw) of at least 200 kg/mol and/or has a molecular weight distribution (MWD) of between 2 and 10.

The herein described inventive process provides high strength transparent HDPE stretched molded article that hitherto have been unavailable and therefor the invention in one embodiment relates to high strength transparent HDPE articles obtainable by the inventive process. Furthermore, in yet another embodiment, the invention relates to high strength transparent HDPE articles wherein the HDPE has a melt flow index (MFI) measured at 21.6 kg and 190° C. according to ASTM D1238 of at most 1.5 g/10 min, an isotropic density measured according to ISO 1183-1A of at most 0.955 g/cm$^3$ and a $T_m$ measured according to ISO 11357-3 of greater than 130° C., wherein the high strength transparent HDPE article has a tensile strength of at least 0.5 GPa and a transmittance of at least 70% when measured at a film thickness of about 0.1 mm and at a wavelength of 550 nm. Preferably the stretched molded article has a tensile strength of at least 0.7, more preferably of at least 0.9 and most preferably at least 1.0 GPa. Further preferred are stretched molded articles with a transparency of at least 80%, more preferably at least 85% and most preferably at least 90% when measured at a film thickness of 0.1 mm and at a wavelength of 550 nm.

Preferably the high strength HDPE article of the invention comprises at least 80 wt %, preferably at least 90 wt %, more preferably at least 95 wt % HDPE and most preferably the high strength transparent HDPE article substantially consists of HDPE.

In a yet preferred embodiment the HDPE of the high strength transparent HDPE article has an MFI (21.6 kg, 190° C.) of at most 1.0 g/10 min, more preferably at most 0.8 g/10 min and most preferably at most 0.5 g/10 min. For high and ultra-high molecular weight polyethylene the melt flow index will reach values lower than 0.1 g/10 min and cannot be accurately measured, accordingly a preferred embodiment of the invention concerns HDPE with a MFI of less than 0.1 and an intrinsic viscosity (IV) of at least 3, preferably at least 4 g/dl.

In another preferred embodiment of the invention the high strength transparent HDPE article comprises a HDPE with an isotropic density of at most 0.953 g/cm$^3$, more preferably at most 0.952 g/cm$^3$ and most preferably at most 0.950 g/cm$^3$. The inventors identified that with further reduction of the isotropic density of the HDPE, transparent articles with further increased strength could be obtained.

The invention further relates to high strength transparent HDPE article wherein the HDPE has weight averaged molecular weight (Mw) of at least 200 kg/mol, preferably at least 250 kg/mol and most preferably 300 kg/mol and/or a molecular weight distribution (MWD) of between 2 and 20, preferably between 3 and 15 and most preferably between 4 and 10.

The transparent articles, especially the transparent tapes, according to the invention are suitable to be assembled to multi layer systems providing products with a substantial transparency or translucence combined with good ballistic or impact resisting properties. Therefor in a further embodiment the invention relates to products comprising the high strength transparent HDPE article according to the invention, preferably the product is a ballistic resistant article, a visor, a car part, a train part, a plane part, a windshield, a window or a radome.

METHODS

Melting temperature ($T_m$), and heat of fusion ($\Delta H_F$) were established by differential scanning calorimetry according to ISO-11357-3 by evaluation of the second heating curve at a heating rate of 10° C./min in the interval from room temperature to 200° C.

The crystallinity ($X_c$) was calculated from the equation: $X_c = \Delta H_F / \Delta H_F^0$, where $\Delta H_F^0$ is the heat of fusion of perfect crystalline HDPE which is assumed to be equal to 280 J/cm$^3$.

SEC-MALS

The molecular mass distributions (Mn, Mw, Mz, Mw/Mn) were measured using a PL-210 Size Exclusion Chromatograph coupled to a multi-band infrared detector (IR5 PolymerChar) and a multi-angle light scattering (MALS) detector (laser wavelength 690 nm) from Wyatt (type DAWN EOS). Two PL-Mixed A columns were used. 1,2,4-trichlorobenzene was used as the solvent, the flow rate was 0.5 ml/min, and the measuring temperature was 160° C. Data acquisition and calculations were carried out via Wyatt (Astra) software. The HDPE should be completely dissolved under such conditions that polymer degradation is prevented by methods known to a person skilled in the art.

Transparency/Haze/Transmittance

Transmittance spectra were measured in the range of 400-700 nm on a Shimadzu (Japan) UV-3102 PC spectrophotometer with a 1-nm interval at 50% humidity and 23° C. The distance between samples and the detector is around 150 mm. A blank measurement was performed, without a sample and the transmitted light to the detector at each wavelength was set to 100%. The recorded light transmission at each wavelength was normalized to the blank measurement and the transmittance value was obtained.

Tensile Properties

The Young's modulus and tensile strength of the drawn samples were measured at room temperature on a Zwick Z100 tensile tester at a crosshead speed of 100 mm/min. The Young's moduli were calculated from the tangents of the engineering stress-strain curves below a strain of 0.1%. In all cases, at least three strips were measured and the mean values of Young's modulus together with tensile strength were calculated and reported. For calculation of the tensile strength, the tensile forces measured are divided by the cross-sectional area, as determined by measuring thickness and width of the molded drawn tapes; values in GPa are calculated with the density of the molded article of 0.96 g/cm$^3$.

Isotropic density was determined according to ISO 1183-1 method A on an isotropic sample obtained by annealing the sample for 1 hour at 160° C.

MFI have been measured according to ASTM D1238, at a weight of 21.6 kg and a temperature of 190° C. Values are commonly expressed in the historical g/10 min which is identical to the SI unit dg/min.

Intrinsic Viscosity (IV)

IV is determined according to ASTM-D1601/2004 at 135° C. in decalin, the dissolution time being 4 hours, with DBPC as anti-oxidant in an amount of 2 g/l solution, by extrapolating the viscosity as measured at different concentrations to zero concentration.

EXPERIMENTAL

HDPE samples with different physical properties (Table 1) have been selected to produce HDPE sheets. Polyethylenes 1 to 4 were homogenized in a co-rotating twin screw extruder at 160° C. for 10 minutes. Extrudates were cooled down in air to room temperature, followed by granulation. Polyethylene 5 was homogenized by casting from a 4 wt % xylene solution.

Substantially isotropic melt-crystallized HDPE sheets with a given thickness of approximately 1 mm were then produced by compression moulding at 160° C. for 10 minutes, followed by quenching to 20° C. Dumbbell-like samples with gauge dimensions 12×2 mm² and a thickness of 1 mm were then cut from the compression-moulded sheets. These dumbbell-like samples were subsequently drawn at different temperatures to various draw ratios in air using a Zwick Z100 tensile tester at a crosshead speed of 100 mm/min to identify the drawing temperature and draw rate resulting in highest tensile properties for each polyethylene. Such optimal drawing conditions and properties are reported in Table 2. The thickness of the drawn samples was calculated by weighing, assuming a density of the oriented PE equal to 0.96 g/cm³. Young's modulus, strength and transmittance of the tapes after uniaxial drawing were measured and are reported in Table 2.

TABLE 1

| Sample | $M_w$ (kg/mol) | MWD (-) | $T_m$ (° C.) | $X_c$ (%) | Density (g/ml) | MFI (g/10 min) |
|---|---|---|---|---|---|---|
| PE1 | 80 | 3.2 | 132.4 | 75.1 | 0.964 | 8.0 (190° C. @2.16 kg) |
| PE2 | 140 | 4.7 | 133.6 | 70.6 | 0.960 | 0.9 (190° C. @2.16 kg) |
| PE3 | 134 | 3.6 | 134.0 | 70.7 | 0.958 | 21 (190° C. @21.6 kg) |
| PE4 | 408 | 5.1 | 132.6 | 61.5 | 0.947 | 0.6 (190° C. @21.6 kg) |
| PE5 | 1,070 | 5.9 | 131.8 | 54.2 | 0.940 | <0.1 (190° C. @21.6 kg) |

TABLE 2

| | Sample | Draw temp. | DR | Modulus (GPa) | Strength (GPa) | Thickn. (µm) | Transm. @550 nm (%) |
|---|---|---|---|---|---|---|---|
| Comp. Exp. 1 | PE1 | 60 | 20 | 19.6 | 0.54 | 100 | 58 |
| Comp. Exp. 2 | PE2 | 80 | 20 | 22.1 | 0.76 | 100 | 57 |
| Comp. Exp. 3 | PE3 | 80 | 20 | 18.2 | 0.64 | 100 | 15 |
| Example 1 | PE4 | 100 | 15 | 16.9 | 0.96 | 100 | 90 |
| Example 2 | PE5 | 120 | 13 | 17.2 | 1.1 | 140 | 67 |

The invention claimed is:

1. A process for the production of a high strength transparent high density polyethylene (HDPE) article comprising the steps of:
   (i) heating HDPE having a melt flow index (MFI) measured at 21.6 kg and 190° C. according to ASTM D1238 of at most 1.5 g/10min, an isotropic density measured according to ISO 1183-1A of at most 0.955 g/cm³, a Tm measured according to ISO 11357-3 of greater than 130° C. and a molecular weight distribution (MWD) of between 2 and 10 to a temperature above a melting temperature ($T_m$) of the HDPE to form a heated HDPE;
   (ii) molding the heated HDPE obtained in step (i) in the absence of solvents to form a hot molded HDPE article;
   (iii) cooling the hot molded HDPE article obtained in step (ii) to a temperature below $T_m$ to form a melt-crystallized HDPE article;
   (iv) stretching the melt-crystallized HDPE article obtained in step (iii) to a total draw ratio of at least 5, wherein the melt-crystallized HDPE article is stretched during at least one stretching step at a temperature $T_1$ below the melting temperature $T_m$ to a draw ratio ($DR_1$) of at least 2 to form the high strength transparent HDPE article.

2. The process according to claim 1 wherein the high strength transparent HDPE article is a high strength fiber, tape or film.

3. The process according to claim 1, wherein before or during molding according to step (ii), the HDPE is heated to a temperature at least 10° C. above the Tm of the HDPE.

4. The process according to claim 1, wherein step (ii) comprises applying a shear rate of less than 10 s⁻¹ to the heated HDPE.

5. The process according to claim 1, wherein $T_1$ is between 100 and 130° C.

6. The process according to claim 1, wherein the the high strength transparent HDPE article comprises at least 90 wt % of the HDPE.

7. The process according to claim 1, wherein the HDPE has a weight average molecular weight (Mw) of at least 200 kg/mol.

8. The process according to claim 1, wherein step (iv) comprises stretching the melt-crystallized HDPE article during at least one further stretching step at a temperature $T_2$, wherein $T_2 > T_1$.

9. The process of claim 1, wherein $T_1$ is between 110° C. and 128° C.

10. The process of claim 1, wherein step (iv) comprises stretching the melt-crystallized HDPE article during at least one further stretching step at a temperature $T_2$, wherein $T_2 > T_m$.

11. A high strength transparent high density polyethylene (HDPE) article obtained by the process according to claim 1.

12. A high strength transparent high density polyethylene (HDPE) article which comprises:
   a high density polyethylene (HDPE) having a melt flow index (MFI) measured at 21.6 kg and 190° C. according to ASTM D1238 of at most 1.5 dg/min, an isotropic density measured according to ISO 1183-1A of at most 0.955 g/cm³, a Tm measured according to ISO 11357-3 of greater than 130° C. and a molecular weight distribution (MWD) of between 2 and 10, wherein
   the high strength transparent HDPE article has a tensile strength of at least 0.5 GPa and a transmittance of at least 70% when measured at a film thickness of 0.1 mm and at a wavelength of 550 nm.

13. The high strength transparent HDPE article according to claim 12, wherein the article comprises at least 90 wt % of the HDPE.

14. The high strength transparent HDPE article according to claim 12, wherein the MFI measured at 21.6 kg and 190° C. according to ASTM D1238 of the HDPE is at most 1.0 g/10min.

15. The high strength transparent HDPE article according to claim 12, wherein the MFI measured at 21.6 kg and 190° C. according to ASTM D1238 of the HDPE is at most 0.8 g/10min.

16. The high strength transparent HDPE article according to claim 12, wherein the MFI measured at 21.6 kg and 190° C. according to ASTM D1238 of the HDPE is at most 0.5 g/10min.

17. The high strength transparent HDPE article according to claim 12, wherein the isotropic density of the HDPE is at most 0.952 g/cm$^3$.

18. The high strength transparent HDPE article according to claim 12, wherein the weight average molecular weight (Mw) of the HDPE is at least 300 kg/mol.

19. A product comprising the high strength transparent HDPE article according to claim 12, wherein the product is a ballistic resistant article, a visor, a car part, a train part, a plane part, a windshield, a window or a radome.

* * * * *